April 14, 1936. J. G. JACKSON 2,037,510
PAN SET
Filed March 9, 1934 2 Sheets-Sheet 1

INVENTOR
JOSEPH G. JACKSON
BY
ATTORNEY

April 14, 1936.   J. G. JACKSON   2,037,510
PAN SET
Filed March 9, 1934   2 Sheets-Sheet 2
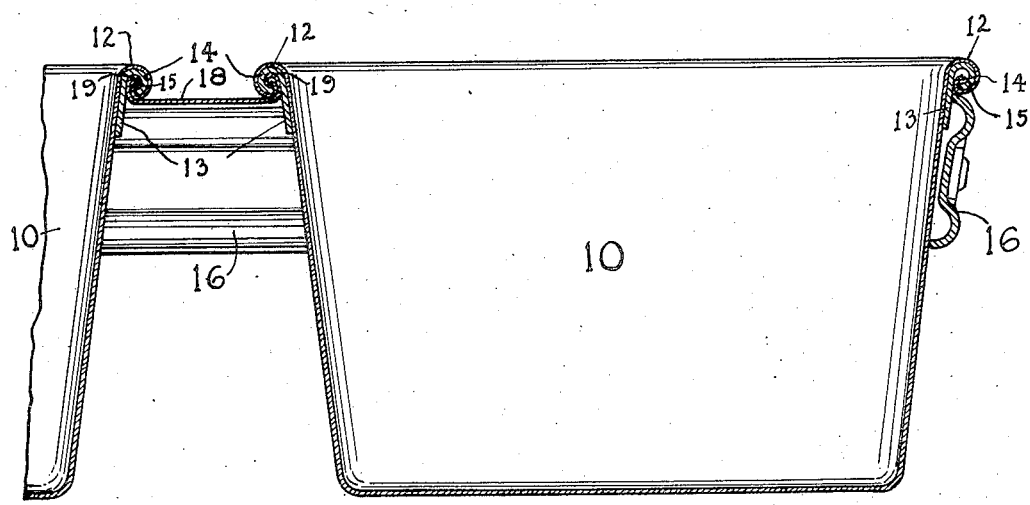
FIG.3.
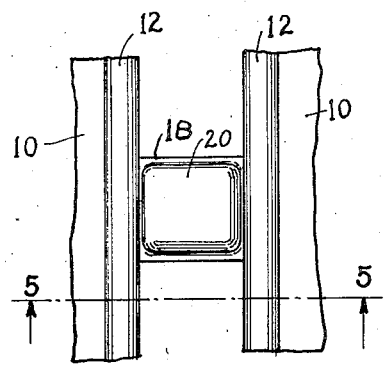   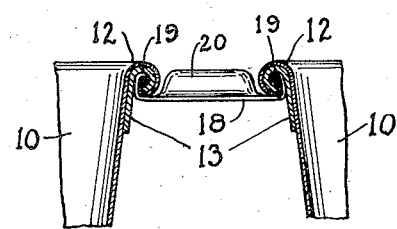
FIG.4.   FIG.5.
INVENTOR
JOSEPH G. JACKSON
BY
ATTORNEY Patented Apr. 14, 1936

2,037,510

UNITED STATES PATENT OFFICE 2,037,510

PAN SET

Joseph G. Jackson, Oak Park, Ill., assignor to Edward Katzinger Company, Chicago, Ill., a corporation of Illinois Application March 9, 1934, Serial No. 714,777

4 Claims. (Cl. 53—6)

This invention relates to baking pan sets wherein a plurality of individual baking pans are secured together in spaced parallel relationship and has for its object the formation of a bead at the upper edge of the walls of each individual pan of the set and the reinforcement of said walls of the pan adjoining said bead.

It is also the object of the present invention to provide spacers or braces between the adjacent walls of adjoining pans which will span the space between the pans and be rigidly secured to the beads of the pans without distorting or warping either the pan walls or their beads.

With the above and other objects in view, as will be apparent, this invention consists in the construction, combination and arrangement of parts, all as hereinafter more fully described, claimed and illustrated in the accompanying drawings, wherein:

Fig. 3 is a transverse section taken along line 3—3 of Fig. 1 to illustrate the spacer or brace between the pans of the set and its cooperation with the bead formed at the edges of the walls of each individual pan of the set;

Fig. 4 is an enlarged plan view of a modified form of the spacer or brace between the adjacent walls of adjoining pans; and Fig. 5 is a transverse section taken along line 5—5 of Fig. 4.

Figure 1:
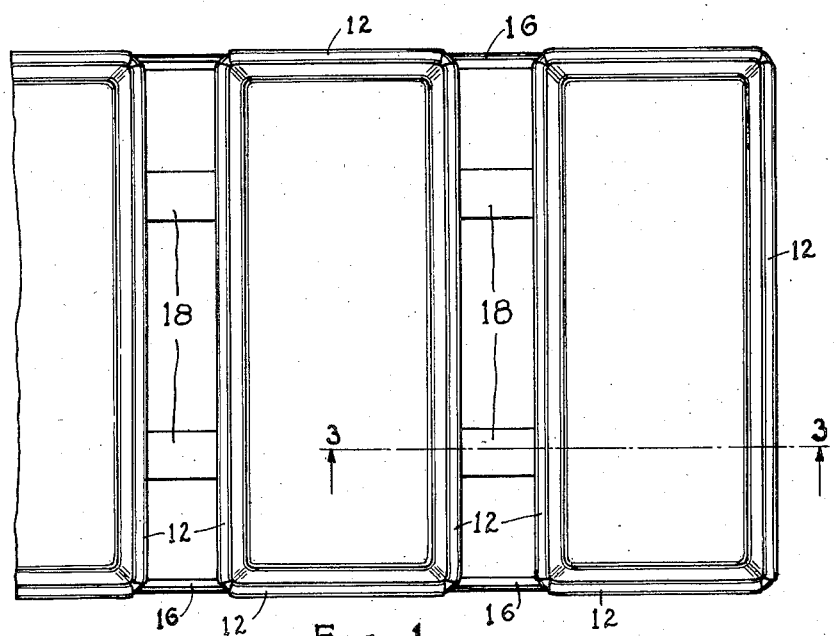
Fig. 1 is a plan view of the pan set constructed in accordance with the present invention.
Figure 2:
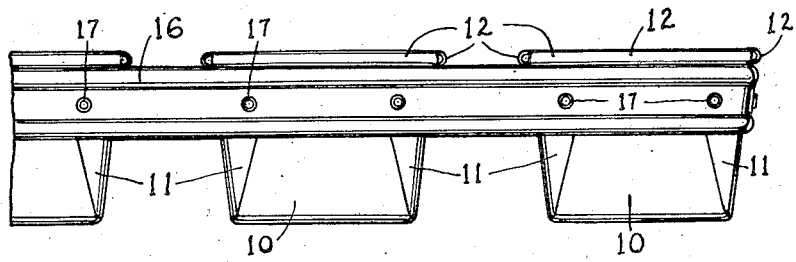
Fig. 2 is a side elevation thereof.

Heretofore, in the construction of pan sets it has been customary to create a bead at the edges of the walls of each individual pan by surrounding the pan with a round wire frame around which flanges at the edges of the walls are bent, the edge of such flanges resting against the body of the pan wall at a point adjoining the wire frame. This type of bead provides no reinforcement for the body of the pan wall adjoining the bead and usually does not provide for the locating or arrangement of the edges of the flanges to prevent their disengagement of or from the wire frame.

The present invention is designed to surround each individual pan with a frame of strip metal which is folded or seamed with the flanges at the edges of the pan walls to create a bead in which the edges of said flanges are permanently located and engaged and at the same time provide a reinforcement for the body of the pan walls adjoining the beads.

Heretofore spacers or braces have been provided between the adjacent walls of adjoining pans which have been engaged by or with the beads common in the prior art and formed by the combination of a round wire frame and flanges at the edges of the pan walls. These spacers or braces of the prior art have not been so engaged by the beads at the edges of the pan walls that displacement thereof is prevented and the present invention has in view a spacer or brace between the adjacent walls of the adjoining pans which will be permanently and rigidly located and engaged in the beads at the edges of the pan walls so that the same will not become loosened or displaced.

Reference being had more particularly to the drawings, 10 designates a baking pan of any suitable construction, here shown as a folded pan with the corner laps 11 resting against the end walls of the pan. At the upper edges of the walls of the pan 10 are provided a series of flanges 12 which are designed to be bent outwardly, downwardly and inwardly to create the beads at the edges of the pan walls as hereinafter more fully described. Each individual pan 10 adjoining the flanges 12 is surrounded by a rectangular frame 13 of strap iron or strip metal which rests flush against the outer surface of the pan walls. As illustrated in Fig. 3 the upper edge 14 of the frame 13 is bent outwardly, downwardly and inwardly to create a bead of any suitable shape and form preferably curved or round. Each flange 12 on the pan walls is bent over the portion 14 of the frame 13 and has its edge 15 crossing the edge of the position 14 and terminating between the bead created by the portion 14 of the frame 13. Thus, the edge 15 of the flange is located within the bead created by the flange 12 and the portion 14 of the frame, where it is permanently engaged and retained between the body of the frame 13 and the edge of the portion 14 thereof.

The body of the frame 13 extends below the outstanding beads thus formed and rests flush against the outer surfaces of the walls of the pan 10 thereby reinforcing and bracing the walls of the pan adjoining the beads. It will be seen that the frame 13 in combination with the flanges 12 creates an outstanding bead at the edges of each wall of the individual pan 10 and at the same time the edges of the flanges 12 are so engaged between the edge of the position 14 of the frame 13 and the body of the frame that the flanges 12 will not under ordinary circumstances, become disengaged from the frame 13, nor will the bead become distorted or disintegrated.

The pans 10, provided with beads, as above described, are then placed in spaced parallel relationship with their end walls in alignment and are surrounded by frames 16 composed of strap iron which bears against the exposed walls of the pans 10 so assembled to be secured thereto in any suitable manner. If the pans are seamless pans and are not provided with the corner laps 11, the frame 16 may be riveted or otherwise attached as at 17, directly to the exposed walls of the pans 10 of the set, but if the pans of the set are folded pans, as illustrated and are consequently provided with the corner laps 11 bearing against their end walls, the frame 16 can be riveted, as at 17, directly to the corner laps 11 so that no rivet or similar elements pass through the exposed walls of the pans 10.

Between the adjacent walls of adjoining pans 10 are one or more spacers or braces 18. In that form of the invention illustrated in Figs. 1 and 3, the spacer or brace comprises a relatively narrow strip of metal 18 positioned in the horizontal plane directly below the beads at the edges of the adjacent walls of adjoining pans 10. At its ends the strip of metal is bent upwardly, as at 19, to be received within the bead at the edges of the adjacent walls of adjoining pans. It will be noted from Fig. 3 that the end portions 19 of the spacer or brace 18 are received within and follow the contour of the bead, whereby they are rigidly and firmly gripped within the bead between the edge portions of the flange 12 and frame 13 and the body of the frame 13. In this manner the ends of the spacer or brace 18 form what may be called an integral part of the bead and the entire bead must be wholly disintegrated in order to release the end portions 19 of the spacer or brace 18 therefrom. It is to be observed that by having the frame 13 interposed between the end portions 19 of the spacer or brace 18 and the wall of the pan 10, no enlargement or distortion of the latter is caused by the engagement of the brace or spacer by the bead.

In that form of the invention shown in Figs. 4 and 5, the body of the spacer 18 is off-set upwardly, as at 20, to create a projection between the bodies of the beads at the edges of the adjacent walls of adjoining pans which increases the strength of the spacer or brace 18 and assists in reinforcing the beads themselves. It is, of course, to be understood that the form and shape of this projection 20 may be varied without departing from the spirit and scope hereof.

What is claimed is:

1. The combination with a pair of adjoining pans, each pan being surrounded by a frame of strap metal and having flanges at the edges of its walls seamed and rolled with the upper edge of said frame to create outstanding beads, of a strap surrounding said pans to secure them one to the other, a brace interposed between the beads of said pans, comprising a strip of metal having its ends bent laterally to be gripped within said beads.

2. The combination with a pair of adjoining pans, each pan being surrounded by a frame of strap metal and having flanges at the edges of its walls seamed and rolled with the upper edge of said frame to create outstanding beads, of a strap surrounding said pans and securing them one to the other, a brace interposed between the beads of said pans, comprising a strip of metal having its ends bent laterally to be gripped within said beads and between the flange and a portion of the frame constituting each bead and the body of the frame.

3. The combination with a pair of spaced pans, the adjacent walls of said pans defining the space between pans, having flanges at the edges thereof, of a primary strap surrounding said pans and cooperating with the exposed walls thereof to incorporate them in a set, and a secondary strap positioned against each pan wall defining the space between pans, the upper edge of each secondary strap being seamed with the flange of the cooperating pan wall to form an outstanding bead, with a portion of the secondary strap projecting below said bead and resting flush against the face to the pan wall.

4. The combination with a pair of spaced pans, the adjacent walls of said pans, defining the space between pans, having flanges at the edges thereof, of a primary strap surrounding said pans and cooperating with the exposed walls thereof to incorporate them in a set, a secondary strap positioned against each pan wall defining the space between pans, the upper edge of each secondary strap being seamed with the flange of the cooperating pan wall to form an outstanding bead, with a portion of the secondary strap projecting below said bead and resting flush against the face to the pan wall, and a brace interposed between the beads adjoining the pan walls, comprising a metallic strip having its ends bent laterally and gripped within said beads between the edge portions of the strap and flange and the body of the strap.

JOSEPH G. JACKSON.